Patented Mar. 21, 1933

1,902,317

UNITED STATES PATENT OFFICE

PERCY C. WRIGHT, OF PITTSBURG, CALIFORNIA, ASSIGNOR TO MINERALS SEPARATION NORTH AMERICAN CORPORATION, OF NEW YORK, N. Y., A CORPORATION OF MARYLAND

FROTH-FLOTATION CONCENTRATION OF ORES

No Drawing.  Application filed July 14, 1926. Serial No. 122,496.

This invention relates to the froth-flotation concentration of ores and is herein illustrated as applied to the concentration of ores by the aid of an organic disulphide, that is a compound consisting of two organic radicals each combined with sulphur and which are united by the sulphur atoms to form a single molecule. An example of such a compound is dixanthogen, otherwise known as xanthic disulphide. It is a non-nitrogenous organic compound consisting of an organic disulphide in which two carbon atoms each forming part of an organic radical are each united to a sulphur atom and the sulphur atoms are united to bind the whole compound into a single molecule. Dixanthogen may be regarded as a combination of two molecules of a salt of xanthic acid in which the removal of the base has led to the union of the disrupted molecules, the unsatisfied affinity of each disrupted molecule being satisfied by its union with the other disrupted molecule. Its formula is structurally written as follows:

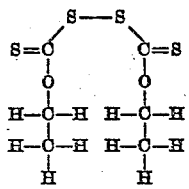

The seventh to the fourteenth examples, inclusive, are of procedures in which other organic disulphides are used to effect froth-flotation ore concentration, in acid, alkaline and neutral pulps, and the processes of these examples, although embodying the present invention in its broad aspect, are not specifically claimed herein.

Dixanthogen is easily produced from sodium and potassium xanthates by a treatment with a substance which will abstract the sodium or potassium from the molecules with the resultant production of dixanthogen. Among such substances are chlorine, bromine, and iodine. It is not always necessary that such materials be free or that the reaction take place in strong solutions. Satisfactory results have been obtained by adding chlorine or chloride of lime in approximately the theoretically required amounts to an ore pulp containing the small proportion of sodium or potassium xanthate usually used.

It is found that frothing agents such as pine oil and cresylic acid in the presence of dixanthogen produce concentrates of extraordinary richness and tend to float many copper, silver, lead and zinc minerals to the exclusion of iron minerals, thus exercising a selective flotative action.

Dixanthogen, as illustrated by the first two of the following examples, is especially useful in alkaline pulps. The third example shows it also to be useful in a neutral pulp. It has also been found to be useful in acid pulps.

The first, second, third and fourth examples show the utility of dixanthogen which has been separately prepared and thereafter added to the ore pulp. This specific procedure embodying the present invention in its broad aspect is not claimed herein. The fifth and sixth examples are of procedures wherein dixanthogen is produced in situ, and such procedures are specifically claimed herein.

*Example 1.*—Suitably ground ore from Utah Copper Company was agitated in an aqueous pulp with 4 pounds of lime, and there was added a mixture of equal proportions of dixanthogen and pine oil in the total amount of 0.4 pounds, all per ton of ore, and the agitation continued to yield a concentrate, middling and tailing. The results were as follows:

| Product | Assay | | Recoveries | |
|---|---|---|---|---|
| | Cu % | Fe % | Cu % | Fe % |
| Heads | 1.24 | 3.0 | 100 | 100 |
| Concentrate | 23.36 | 31.6 | 62 | 34.7 |
| Middling | 7.36 | 12.2 | 23.1 | 16.0 |
| Tails | .20 | 1.6 | 14.9 | 49.3 |

*Example 2.*—Suitably ground ore from Inspiration Copper Company was agitated in an aqueous pulp with 3 pounds of lime, and there was added a mixture of equal proportions of dixanthogen and pine oil in the total amount of 0.4 pounds, all per ton of ore, and the agitation continued to yield a concentrate, a middling and a tailing. The results, showing extraordinary richness of the concentrate, were as follows:

| Product | Assay | | Recoveries | |
|---|---|---|---|---|
| | Cu % | Fe % | Cu % | Fe % |
| Heads | .945 | 2.2 | 100 | 100 |
| Concentrate | 44.44 | 16.9 | 56.4 | 9.4 |
| Middling | 4.16 | 5.5 | 11.0 | 6.1 |
| Tails | .32 | 1.9 | 32.6 | 84.5 |

*Example 3.*—Suitably ground California Rand gold-silver ore was agitated in an aqueous pulp with 0.2 pounds of dixanthogen mixed with an equal quantity of pine oil, per ton of ore, to yield a concentrate, a middling and a tailing. The results are shown in the following table:

| Product | Assays | | Recoveries | |
|---|---|---|---|---|
| | Au oz. | Ag oz. | Au % | Ag % |
| Heads | 2.88 | 39.89 | 100.0 | 100.0 |
| Concentrate | 3.80 | 1267.4 | 48.2 | 92.1 |
| Middling | 1.24 | 32.8 | 31.6 | 4.9 |
| Tails | .05 | 1.2 | 20.2 | 3.00 |

*Example 4.*—Iron-bearing zinc middlings from Judge Mining and Smelting Company were agitated in an aqueous pulp with a mixture in equal proportions of dixanthogen and pine oil in the total amount of 0.4 pounds per ton of solids, to yield a finished concentrate. The pulp had previously been made alkaline with 3 pounds of lime per ton of solids. The results are shown in the following table:

| Product | Assays Zn % | Recoveries |
|---|---|---|
| Heads | 38.1 | 100 |
| Concentrate | 57.4 | 89 |
| Tails | 12.5 | 11 |

*Example 5.*—Another portion of similarly describable middlings was agitated in an aqueous pulp with 0.25 pounds of potassium xanthate, to which was then added 0.2 pounds of commercial bleaching powder (viz. chloride of lime, containing, when fresh, about 35% available chlorine), and 0.2 pounds of pine oil, all per ton of solids, so as to yield a finished concentrate. The chlorine of the bleaching powder reacted with the potassium xanthate to form dixanthogen. The large rejection of the iron and the other results are shown in the following table:

| Product | Assays | | Recoveries | |
|---|---|---|---|---|
| | Zn % | Fe % | Zn % | Fe % |
| Heads | 37.00 | 9.66 | 100 | 100 |
| Concentrate | 57.00 | 2.70 | 91 | 16.2 |
| Tails | 8.90 | 19.60 | 9 | 83.8 |

*Example 6.*—Another portion of similarly describable middlings was agitated in an aqueous pulp with 0.25 pounds of potassium xanthate and 0.2 pounds of pine oil, both per ton of the solids, and then there was passed into the pulp about 0.06 to 0.07 pounds of chlorine gas, per ton of solids, from a storage cylinder. Agitation was continued to yield a finished concentrate. The richness of the concentrate and the other results are shown in the following table:

| Product | Assays Zn % | Recoveries Zn % |
|---|---|---|
| Heads | 38.1 | 100.0 |
| Concentrate | 59.8 | 88.0 |
| Tails | 10.5 | 12.0 |

*Example 7.*—Utah copper impact screen undersize was reground with 0.4 pounds of ethyl-disulphide per ton and then agitated in an aqueous pulp for ten minutes with 0.25 pounds of cresol per ton. The results are shown in the following table:

| Product | Assays | | | Recoveries | |
|---|---|---|---|---|---|
| | % Wt. | Cu | Fe | Cu | Fe |
| Heads | 100.0 | 1.23 | 1.62 | 100.0 | 100.0 |
| Concentrate | 7.01 | 16.48 | 12.5 | 89.9 | 54.1 |
| Tails | 92.99 | .14 | .8 | 10.1 | 45.9 |

*Example 8.*—Utah copper impact screen undersize was reground with 6 pounds of calcium oxide and with 0.4 pounds of ethyl-disulphide per ton and then agitated for ten minutes in an aqueous pulp with 0.4 pounds of cresol per ton. The results are shown in the following table:

| Product | Assays | | | Recoveries | |
|---|---|---|---|---|---|
| | % Wt. | Cu | Fe | Cu | Fe |
| Heads | 100.0 | 1.34 | 1.61 | 100.0 | 100.0 |
| Concentrate | 4.73 | 25.44 | 13.8 | 90.1 | 40.7 |
| Tails | 95.27 | .14 | 1.0 | 9.9 | 59.3 |

*Example 9.*—Utah copper impact screen undersize was reground with 6 pounds of calcium oxide per ton and agitated for ten minutes in an aqueous pulp with 0.4 pounds per ton of a 20% solution of ethyl-disulphide in cresol together with an additional 0.3 pounds of cresol per ton. The results are shown in the following table:

| Product | Assays | | | Recoveries | |
|---|---|---|---|---|---|
| | % Wt. | Cu | Fe | Cu | Fe |
| Heads | 100.0 | 1.31 | 1.37 | 100.0 | 100.0 |
| Concentrate | 5.14 | 22.48 | 10.0 | 88.4 | 37.6 |
| Tails | 94.86 | .16 | 0.9 | 11.6 | 62.4 |

*Example 10.*—Utah copper ore was agitated in an aqueous pulp with 14.8 pounds of sulphuric acid per ton of ore and with a small quantity of pine oil and 0.21 pounds of iso-amyl-disulphide per ton of ore. A concentrate was obtained carrying 9.3% of copper and 26.3% of iron and containing the desired amount, 34.4% of insolubles. This left a tailing containing 0.11% of copper and represented a recovery of 90.5% of the copper in the ore.

Sometimes an exceedingly small proportion of a disulphide is extremely effective as in the following example:

*Example 11.*—Utah copper impact screen undersize was reground with 6 pounds of calcium oxide per ton of ore and agitated in an aqueous pulp with 0.4 pounds of a 20% solution of phenyl-disulphide in cresol per ton of ore. The results are shown in the following table:

| Product | Assays | | | Recoveries | |
|---|---|---|---|---|---|
| | % Wt. | Cu | Fe | Cu | Fe |
| Heads | 100.0 | 1.32 | 1.65 | 100.0 | 100.0 |
| Concentrate | 6.01 | 19.84 | 10.3 | 90.1 | 37.5 |
| Tail | 93.99 | .14 | 1.1 | 9.9 | 62.5 |

When a larger amount of phenyl-disulphide was used a somewhat richer concentrate was obtained with an increased content of iron and a very slightly diminished recovery of the copper of the ore.

*Example 12.*—Anaconda table tailings were agitated in an aqueous pulp with 12 pounds of sulphuric acid per ton of solids and with a small amount of pine oil and with paraffin gas distillate and with 0.23 pounds of n-amyl-disulphide per ton of solids. After re-treatment a concentrate was obtained containing 10.8% of copper and 30.5% of iron and carrying 12.3% of insolubles. The tailings carried 0.8% of copper representing a recovery of 82.5% of the copper in the material.

*Example 13.*—A repetition of the latter procedure substituting carbonate of soda for the acid and omitting the paraffin gas distillate yielded a concentrate containing 14.8% of copper, 16.2% of iron and 32.5% of insolubles. This left a tailing carrying 0.16% of copper and represents a recovery of 77.2% of the copper present in the material.

*Example 14.*—Anaconda table tailings were agitated in an aqueous pulp with a small amount of pine oil and paraffin gas distillate and with 0.1 pound of cresyl-disulphide both per ton of ore. This produced a concentrate containing 13.7% of copper and left 0.15% of copper in the tailings representing a recovery of 89.8% of the copper in the material treated.

Having thus described certain embodiments of the invention, what is claimed is:

1. The process of concentrating ores which consists in mixing an xanthate and another material in an ore pulp so as to yield dixanthogen, agitating the pulp so as to produce a mineral-bearing froth, and separating the froth.

2. The process of concentrating ores which consists in mixing in an ore pulp an alkali-metal xanthate with a substance adapted to react therewith to produce dixanthogen, agitating the pulp with a mineral-frothing agent to produce a mineral-bearing froth, and separating the froth.

3. The process of concentrating ores which consists in mixing with an ore pulp a mineral-frothing agent in the presence of available chlorine and an xanthate so as to produce dixanthogen, agitating the pulp to form a mineral-bearing froth, and separating the froth.

4. The process of concentrating ores which consists in mixing with an ore pulp a mineral-frothing agent, in the presence of chloride of lime and an xanthate so as to produce dixanthogen, agitating the pulp to form a mineral-bearing froth, and separating the froth.

In testimony whereof, I have affixed my signature to this specification.

PERCY C. WRIGHT.